(12) United States Patent
Tsuchiya et al.

(10) Patent No.: US 7,346,422 B2
(45) Date of Patent: Mar. 18, 2008

(54) SYSTEM FOR ASSISTING SELECTION OF POWER TOOL (75) Inventors: Tsuyoshi Tsuchiya, Tokyo (JP); Yoshinori Suzuki, Ikoma (JP)

(73) Assignee: Matsushita Electric Works, Ltd., Osaka (JP)

( * ) Notice: Subject to any disclaimer, the term of this patent is extended or adjusted under 35 U.S.C. 154(b) by 25 days.

(21) Appl. No.: 10/542,012

(22) PCT Filed: Mar. 22, 2004

(86) PCT No.: PCT/JP2004/003876

§ 371 (c)(1),
(2), (4) Date: Jul. 12, 2005

(87) PCT Pub. No.: WO2004/082894

PCT Pub. Date: Sep. 30, 2004

(65) Prior Publication Data

US 2006/0142894 A1    Jun. 29, 2006

(30) Foreign Application Priority Data

Mar. 20, 2003   (JP)   ............................. 2003-078742

(51) Int. Cl.
*G06F 19/00* (2006.01)
(52) U.S. Cl. .................. 700/168; 700/179; 700/180
(58) Field of Classification Search ................ 700/168, 700/179
See application file for complete search history.

(56) References Cited

U.S. PATENT DOCUMENTS 4,896,273 A * 1/1990 Moore et al. ................ 700/179
5,105,130 A 4/1992 Barker et al.
5,903,462 A * 5/1999 Wagner et al. .............. 700/168
6,021,360 A * 2/2000 Barker et al. ............... 700/174
7,138,785 B2 * 11/2006 Brotto et al. ................ 320/106

(Continued)

FOREIGN PATENT DOCUMENTS

JP          2-15906          1/1990

(Continued)

OTHER PUBLICATIONS

English language abstract of JP 2000-334670.

(Continued)

*Primary Examiner*—Ryan A. Jarrett
(74) *Attorney, Agent, or Firm*—Greenblum & Bernstein, P.L.C.

(57) ABSTRACT

It is determined whether a power tool is suitable for a work description for which the power tool is used or not, and when it is not suitable for the work description, a suitable power tool is selected and presented to a user. The power tool has a memory, and data concerning a work record is stored in the memory. When the power tool is connected to an assist apparatus installed in a shop or the like, the data concerning the work record is read out from the memory, and the work description is estimated according to a program run in the assist apparatus. Then, it is judged whether the power tool is suitable for the estimated work description or not. When the power tool is not suitable for the work description, a power tool suitable for the work is selected from a previously stored database and presented to the user.

8 Claims, 8 Drawing Sheets

U.S. PATENT DOCUMENTS

| | | |
|---|---|---|
| 2005/0034883 A1 | 2/2005 | Yamada et al. |
| 2005/0045353 A1 | 3/2005 | Kawai et al. |
| 2005/0109519 A1 | 5/2005 | Kawai et al. |
| 2006/0091858 A1* | 5/2006 | Johnson et al. ............. 320/128 |

FOREIGN PATENT DOCUMENTS

| | | |
|---|---|---|
| JP | 7-105469 | 4/1995 |
| JP | 7-113864 | 5/1995 |
| JP | 11-320338 | 11/1999 |
| JP | 2000-334670 | 5/2000 |
| JP | 2000-176850 | 6/2000 |

OTHER PUBLICATIONS

English language abstract of JP 11-320338.
English language abstract of JP 2000-176850.
English language abstract of JP 07-113864.
English language abstract of JP 02-15906.
English language abstract of JP 07-105469.

* cited by examiner

|    | WORKING TIME          | FREQUENCY |
|----|-----------------------|-----------|
| Ca | LESS THAN 2.5 SEC     | 2         |
| Cb | 2.5 TO LESS THAN 5 SEC | 1        |
| Cc | 5 TO LESS THAN 7.5 SEC | 5        |

FIG. 9

SYSTEM FOR ASSISTING SELECTION OF POWER TOOL

TECHNICAL FIELD

The present invention relates to a system for assisting selection of power tool for selecting a power tool suitable for work description, a power tool suitable for the system with a memory for storing data concerning a use record therein, a program run in the system and a recording medium recording the program therein.

BACKGROUND ART

In Japanese Laid-Open Patent Publication No. 2000-334670, for example, when a plurality of operators perform screw tightening work by using a plurality of power tools (electric drivers) in assembly process of products in a factory, a power tool control system is described that screw tightening information is transmitted to each power tool via a network to achieve equalization of screw tightening quality.

Furthermore, in Japanese Laid-Open Patent Publication No. 11-320338, it is disclosed that data such as used hours or use times is recorded in a tool to estimate lifetime and the like of the tool.

By the way, when a very small screw is tightened into a small-sized product such as a camera, an electric driver for low-load work having a small tightening torque is suitable, even though it is a power tool belonging to the same category such as an electric driver. Alternatively, to tighten a relatively large screw into a large-sized product such as a car, an electric driver for high-load work having a large tightening torque is suitable. The screw tightening work includes not only the operation for tightening a male screw to a female screw previously formed but also an operation called self-tapping for directly tightening a male screw to a location where a female is not formed with forming a female screw at the same time. Still furthermore, there are cases that the power tool is operated continuously or intermittently depending on the work description or habitual practice of users, so that the degree of consumption of a battery varies in each case. Thus, to increase efficiency of assembly work, it is important to select and use the most suitable power tool according to the work description.

DISCLOSURE OF INVENTION

However, it is difficult for a user to judge whether a power tool used currently is the most suitable for the current work description or not. Furthermore, when the power tool currently used is not suitable for the current work description, the power tool may be advantageously replaced with another power tool suitable for the work description to increase efficiency of assembly process. In such a case, even when a more suitable power tool exists, the user cannot grab the fact as a practical manner. Still furthermore, even when the power tool is not replaced, it is preferable to comprehend capabilities of the power tool and to use the power tool in the most efficient manner so as to match the work description.

A first object of the present invention is to provide a system for assisting selection of power tool for selecting and presenting a power tool suitable for the work description of the user.

Furthermore, a second object of the present invention is to provide a power tool capable for storing data concerning a use record to grasp the work description of the user and for outputting the data to the system for assisting selection of power tool.

Still furthermore, a third object of the present invention is to provide a program for assisting selection of power tool run in a computer for performing the system for assisting selection of power tool.

Still furthermore, a fourth object of the present invention is to provide a recording medium for recording the program for assisting selection of power tool that is read into the computer and performs the system for assisting selection of power tool.

A system for assisting selection of power tool in accordance with an aspect of the present invention is provided in a power tool, is connected to a memory for storing data concerning a model or specification of the power tool and data concerning a use record therein, reads out the data from the memory, judges whether the power tool is suitable for work description for which the power tool is used by using the data read out or not, and selects and presents the power tool suitable for the work description when the power tool is not suitable for the work description. The system for assisting selection of power tool comprises: a memory unit for storing data concerning a plurality of selectable models and specifications of the power tools; a work description estimation unit for estimating the work description by using the data concerning the use record read out from the memory; a power tool suitability judging unit for judging whether the model or specification of the power tool is suitable for the estimated work description or not; a power tool selection unit for selecting the model of the power tool with the specification suitable for the estimated work description among the models of the power tools stored in the memory unit when a judgment is made that the model or specification of the power tool is not suitable for the estimated work description; and a display unit for displaying result of judgment by the power tool suitability judging unit and the model of the power tool selected by the power tool selection unit.

According to such a system for assisting selection of power tool, the user can diagnose whether the used power tool is suitable for the work description or not only by bringing a detachable nonvolatile memory such as a memory card attached to his/her own power tool itself to a shop or a service center of the power tool and connecting the memory to the system for assisting selection of power tool. Furthermore, when the used power tool is not suitable for the work description, a model of a power tool suitable for the work description can be presented. Thus, when the power tool is replaced by purchase, for example, the user can refer to the presented content.

A system for assisting selection of power tool in accordance with another aspect of the present invention comprises: a motor for generating driving force; a switch operated by the user; a control unit for controlling on/off of power supply to the motor depending on turn-on/turn-off of the switch; and a memory connected to the control unit for storing data concerning a use record therein and outputting the stored data to another device.

According to such a power tool, since a record while the user actually used the power tool is stored in the memory, it is possible to diagnose whether the used power tool is suitable for the work description or not by the above-mentioned system for assisting selection of power tool. Furthermore, since makers or dealers of the power tool can grasp use condition of the power tool by the user, it is possible to utilize the information for development of new products and sales of products more suited to the needs of the user.

A program for assisting selection of power tool in accordance with still another aspect of the present invention selects and presents a power tool suitable for work description of a user by being read and run in a computer. The program for assisting selection of power tool comprises: a step of reading out data concerning a model or specification of the power tool and data concerning a use record from a memory provided in the power tool; a step of estimating a work description by using the data concerning use record read out from the memory; a step of judging whether the model or specification of the power tool is suitable for the estimated work description or not; a step of selecting the model of the power tool with the specification suitable for the estimated work description among the models of the power tools previously stored when a judgment is made that the model or specification of the power tool is not suitable for the estimated work description; and a step of displaying the result of judgment and the selected model of the power tool.

A service for assisting selection of power tool is offered in shops and service centers of the power tool located all over the world by recording the program for assisting selection of power tool in a recording medium such as an optical disk and providing the disk or downloading the program for assisting selection of power tool via internet. Since the service is offered by means of a general personal computer, economic burden imposed on the makers or dealers can be reduced.

A recording medium that records a program for assisting selection of power tool therein in accordance with still another aspect of the present invention records a program which selects and presents a power tool suitable for work description of the user by being read and run in a computer. The recording medium records a program comprising: a step of reading out data concerning a model or specification of the power tool and data concerning a use record from a memory provided in the power tool; a step of estimating a work description by using the data concerning use record read out from the memory; a step of judging whether the model or specification of the power tool is suitable for the estimated work description or not; a step of selecting the model of the power tool with the specification suitable for the estimated work description among the models of the power tools previously stored when a judgment is made that the model or specification of the power tool is not suitable for the estimated work description; and a step of displaying the result of judgment and the selected model of the power tool.

By providing such recording medium that records the program for assisting selection of power tool therein, a service for assisting selection of power tool is offered in shops and service centers of the power tool located all over the world by means of a general personal computer.

BEST MODE FOR CARRYING OUT THE INVENTION

Figure 1:
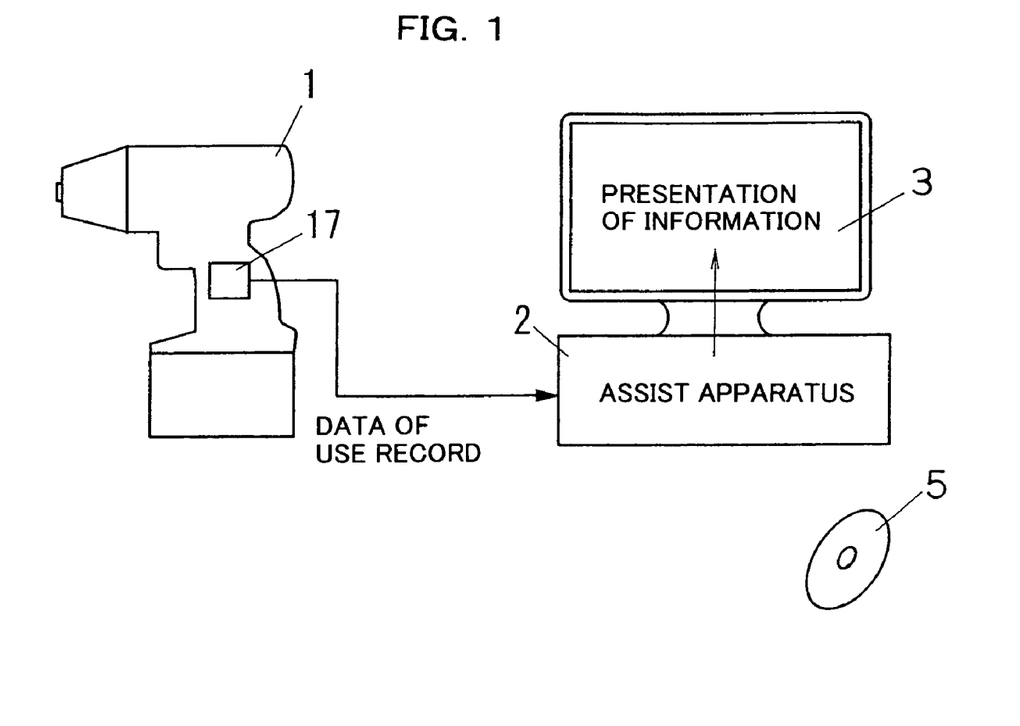
FIG. 1 is a view showing a system for assisting selection of power tool in accordance with an embodiment of the present invention.

An embodiment of the present invention will be described with reference to figures. A system for assisting selection of power tool in accordance with the embodiment is shown in FIG. 1. The system for assisting selection of power tool is configured by an assist apparatus 2 to which a power tool 1 is to be connected, a display 3 for displaying presented information processed by the assist apparatus 2, and so on. The assist apparatus 2 is a personal computer for running a program for assisting selection of power tool, reads out data stored in a memory 17 built in the power tool 1 and judges whether the power tool 1 itself is suitable for the work description for which the power tool is used or not on the basis of the read data. When the power tool 1 is not suitable for the work description, it selects a model of a power tool suitable for the work description. Results of judgment on suitability of the power tool and selection of the model of the suitable power tool are displayed on the display 3.

The program for assisting selection of power tool is recorded in a recording medium 5 such as an optical disk, which is capable of being read by a computer and offered from a power tool maker or the like to shops and service centers. By installing the program for assisting selection of power tool into a personal computer in the shops and service centers, the personal computer can be used as the above-mentioned assist apparatus 2. Alternatively, it is possible that the program for assisting selection of power tool is offered to the shops and service centers by being downloaded from a server set up by the maker via internet.

Figure 2:
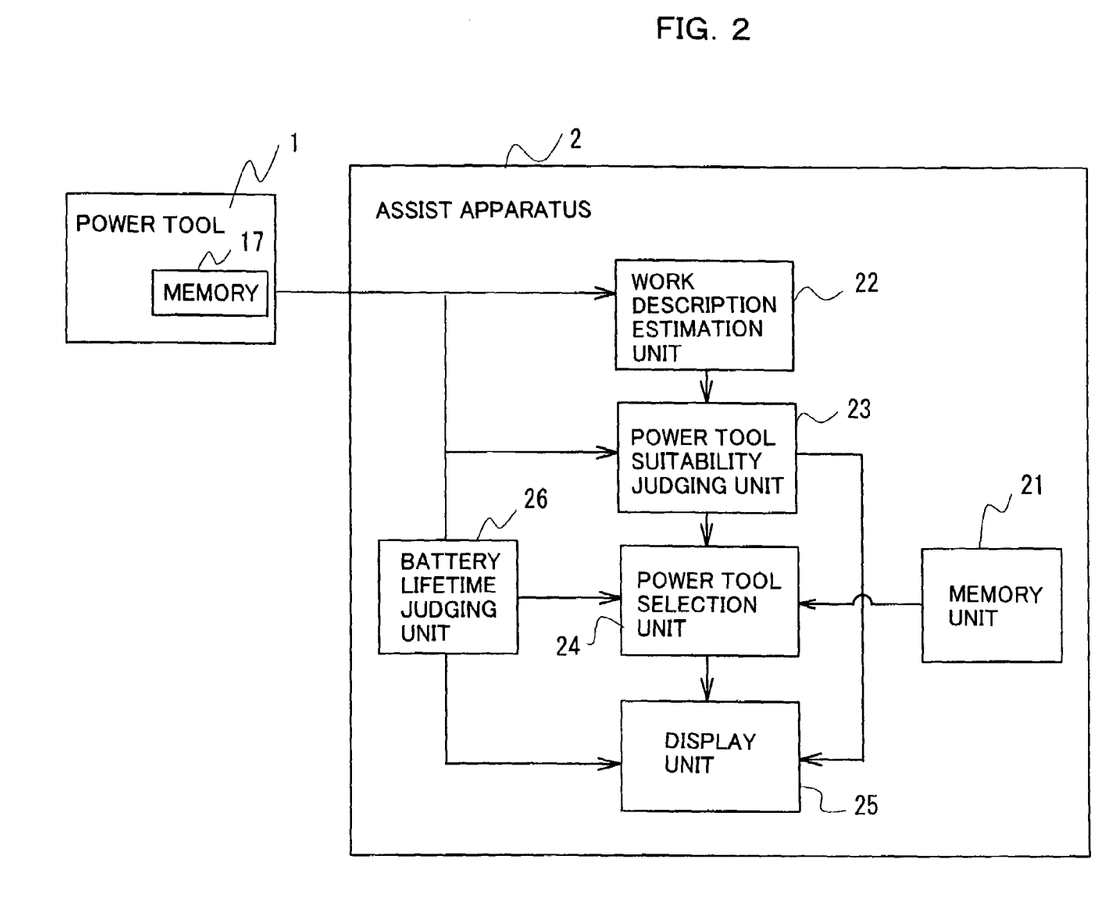
FIG. 2 is a block diagram showing functions performed by a personal computer in the system for assisting selection of power tool.

A function block performed in the personal computer as the assist apparatus 2 in the system for assisting selection of power tool is shown in FIG. 2. As widely known, the personal computer is comprised of CPU, ROM, RAM and a memory device such as hard disk. In the hard disk that serves as a memory unit 21, data concerning a plurality of selectable models of the power tools and their specifications are memorized in addition to the program for assisting selection of power tool described later.

According to the program for assisting selection of power tool, the CPU serves as a work description estimation unit 22 so that it reads out data concerning the use record from the memory 17 of the power tool 1 and estimates the work description using the data read out. When the work description is estimated, the CPU serves as a power tool suitability judging unit 23 and judges whether the model or specification of the power tool 1 is suitable for the estimated work description or not. When it is judged that the model or specification of the power tool 1 is not suitable for the estimated work description, the CPU serves as a power tool selection unit 24 and selects a model of the power tool having the specification suitable for the estimated work description among the models of power tools stored in the memory unit 21. The result of judgment by the power tool suitability judging unit 23 and the model of power tool selected by the power tool selection unit 24 are displayed on the display 3 that serves as a display unit 25. Besides, the result of judgment and selected model of the selected power tool may be output by use of a printer.

In case that the power tool 1 has a rechargeable secondary battery pack, the memory unit 21 further stores a plurality of models and specifications of the secondary battery packs capable of being attached to the power tool 1, and a plurality of models and specifications of the battery chargers for charging the secondary battery pack. The power tool selection unit 24 may be configured so as to further select the models of the secondary battery pack and battery charger suitable for the estimated work description. Furthermore, when record data concerning charge/discharge of the secondary battery is further stored in the memory 17 of the power tool 1, the CPU serves as a battery lifetime judging unit 26 and judges a lifetime of the secondary battery pack. Furthermore, remaining lifetime or replacement time of the secondary battery pack may be displayed on the display unit 25.

Figure 3:
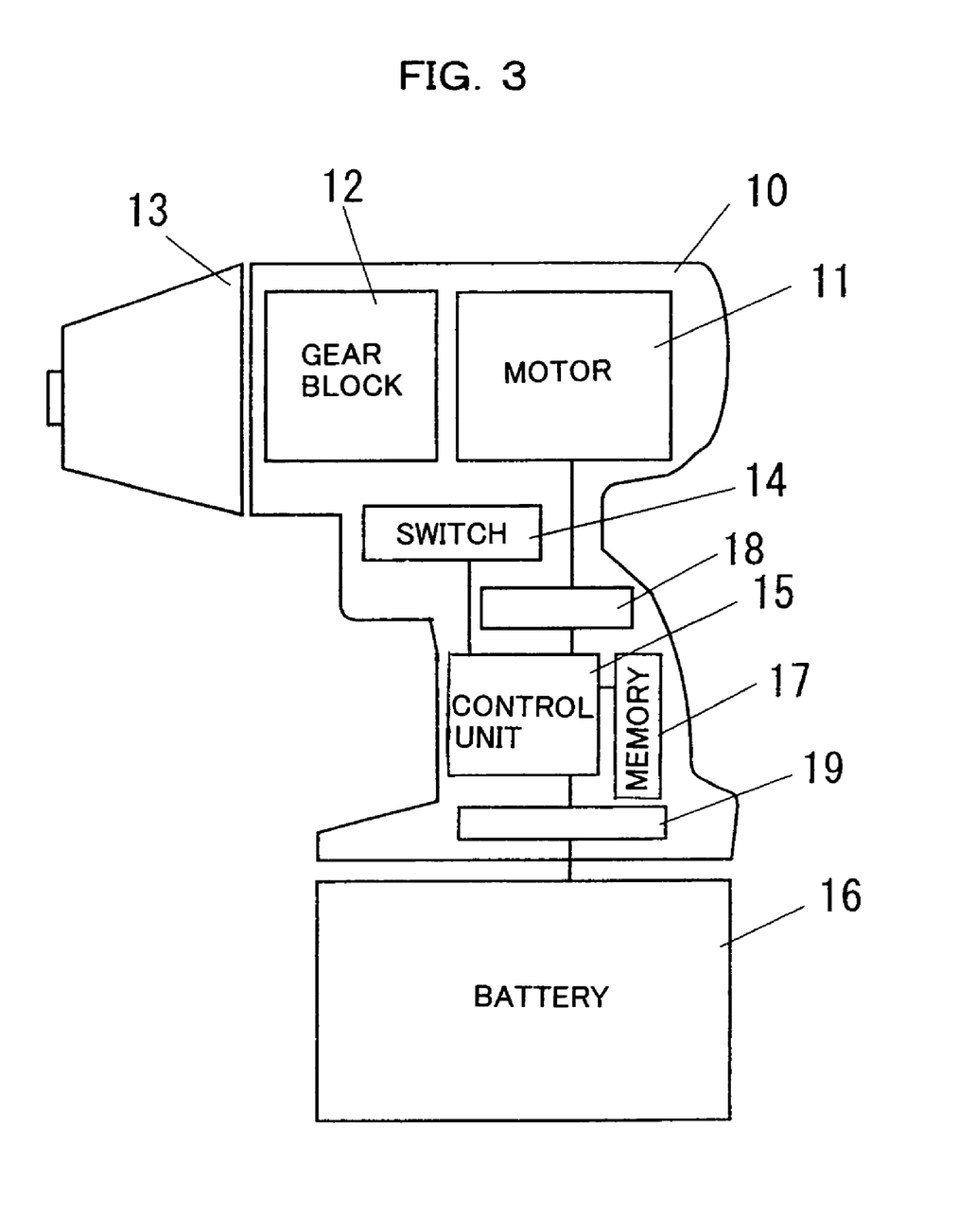
FIG. 3 is a block diagram showing a configuration of a power tool in accordance with the embodiment.

A block configuration of the power tool in accordance with this embodiment is shown in FIG. 3. As shown in FIG. 3, the power tool 1 in accordance with this embodiment is an electric driver, and comprises a housing 10, a motor 11 as a power source, a gear block 12 for decreasing rotational speed of an output axis of the motor 11 and sliding a clutch disk when a torque of the motor 11 is too strong, a chucking unit 13 for chucking a driver bit or the like, a switch 14 operated by a user, a control unit 15, a secondary battery pack 16, the memory 17 formed of a nonvolatile memory, a motor current monitoring unit 18 comprised of a current sensor for monitoring currents flowing to the motor 11 and so on, and a battery monitoring unit 19 comprised of a current sensor or a temperature sensor for monitoring discharge currents or temperature of the secondary battery pack 16.

Figure 4:
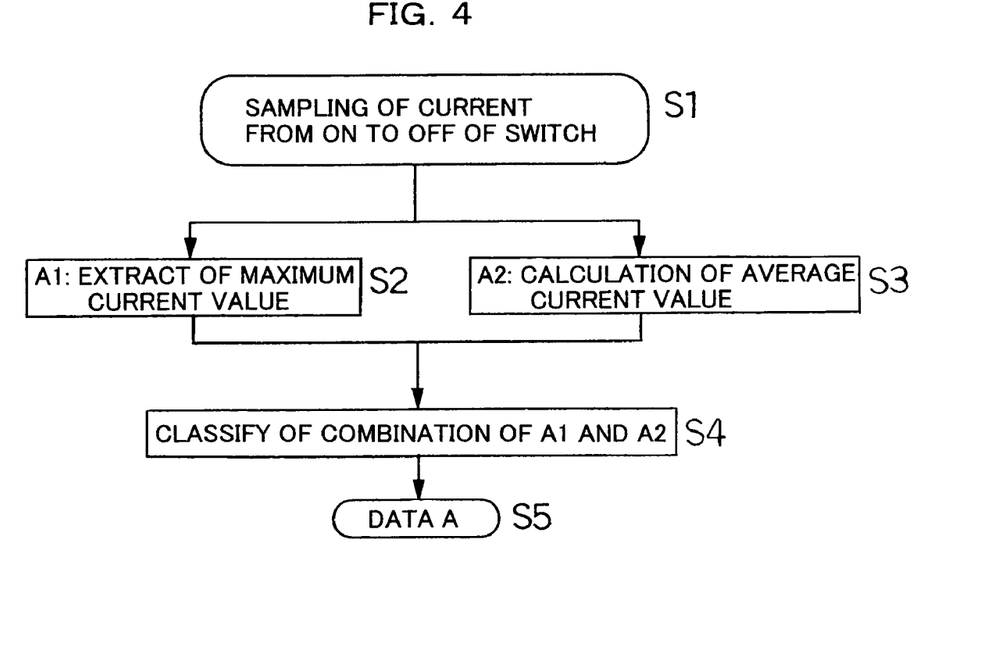
FIG. 4 is a flowchart showing a process for obtaining data concerning currents flowing to a motor of the above-mentioned power tool.

The control unit 15 controls the driving of the motor 11 in response to an input from the switch 14. At this time, as shown in FIG. 4, the motor current monitoring unit 18 performs sampling of values of the current flowing to the motor 11 while the switch 14 is turned on (S1). On the basis of an output from the motor current monitoring unit 18, the control unit 15 extracts a maximum current value during on-period from the values of the current (S2), and calculates an average current value (S3). Then, based on the relation between the maximum current value and the average current value as shown in FIG. 5, the control unit 15 classifies the combinations of the maximum current value and the average current value into groups (S4), and writes data A representing the groups in which the combinations are belonged into the memory 17 (S5).

Figure 5:
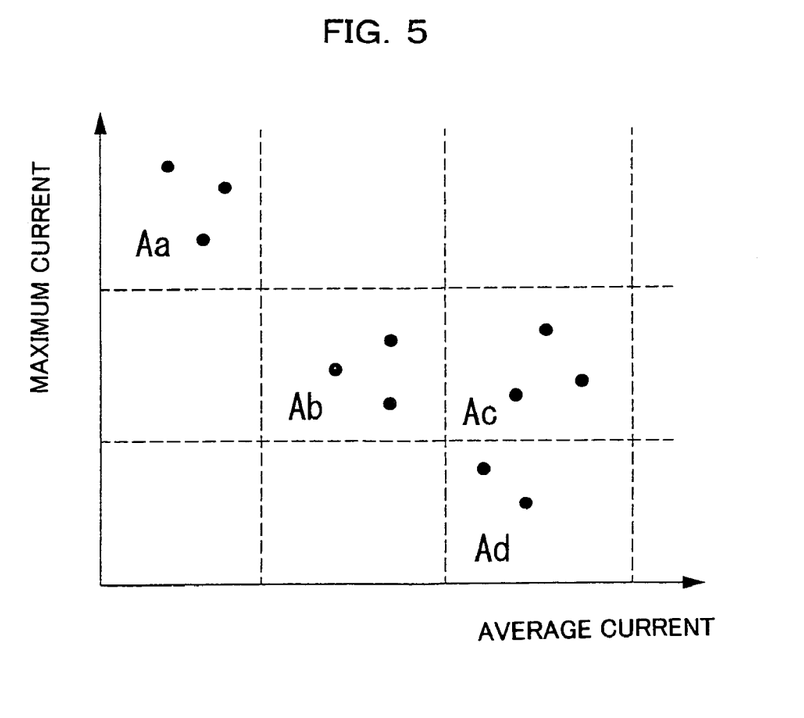
FIG. 5 is a diagram showing a relation between maximum currents and average currents of the currents flowing to the motor of the power tool.

In FIG. 5, one dot corresponds to one operation during the period from turn-on to turn-off of the switch 14. A group Aa shows a use where the maximum current value is large and the average current value is small. A group Ab shows a use where both of the maximum current value and average current value are medium. A group Ac shows a use where the maximum current value is medium and the average current value is large. A group Ad shows a use where the maximum current value is small and the average current value is large. In FIG. 5, working time during the period from turn-on to turn-off of the switch 14 is not considered.

Subsequently, based on the input from the motor current monitoring unit 18, the control unit 15 measures a working time during the period from turn-on to turn-off of the switch 14 and a resting time during the period from turn-off to next turn-on of the switch 14, and writes data B concerning continuity of work including the following data B1 to B4 into the memory 17.

Figure 6:
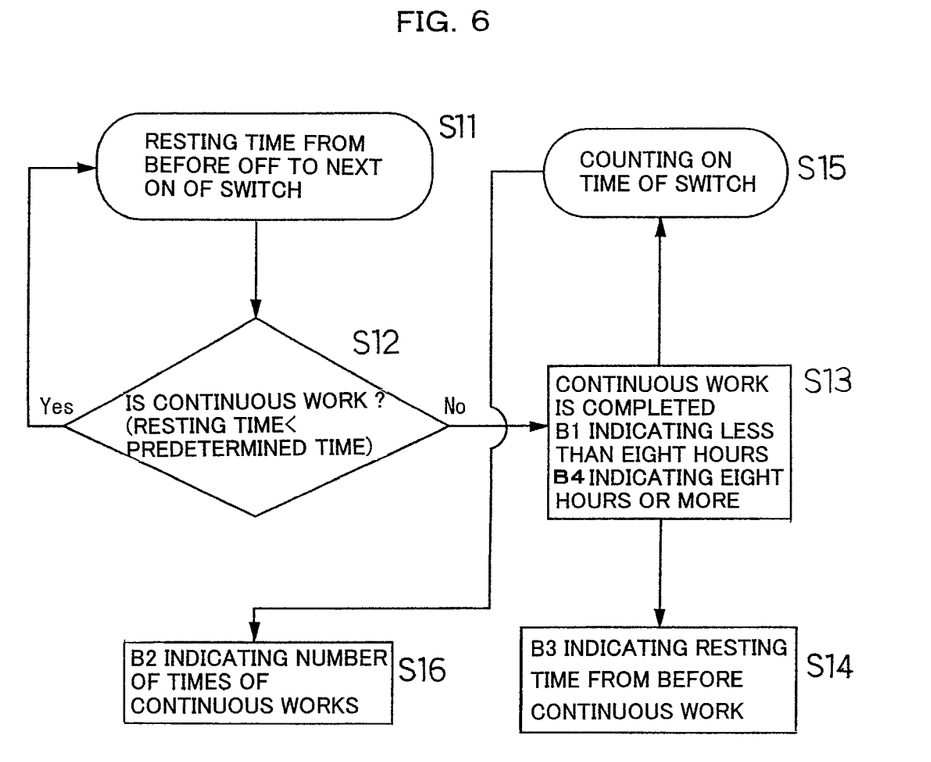
FIG. 6 is a flowchart showing a process for obtaining data concerning continuity of work in the power tool.

As shown in FIG. 6, the control unit 15 measures the resting time during the period from turn-off to the next turn-on of the switch 14 (S1), and judges whether the resting time is less than a predetermined time or not (S12). When the resting time is less than a predetermined time, the control unit 15 judges that continuous work is performed (Yes in S12). On the other hand, when the resting time is equal to or longer than the predetermined time, the control unit 15 judges that continuous work is completed at that time (No in S12).

After judging that continuous work is completed, the control unit 15 writes the data B1 indicating less than eight hours when a measured value of continuous working time is less than eight hours, and alternatively, writes the data B4 indicating equal to or longer than eight hours when the measured value of continuous working time is equal to or longer than eight, into the memory 17 (S13). Furthermore, the control unit 15 calculates the resting time during the period from the previous continuous work to the next continuous work, and writes the data B3 indicating the resting time into the memory 17 (S14). Still furthermore, the control unit 15 counts a number of turn-on of the switch 14 (S15), and writes the data B2 indicating the number of times of continuous work into the memory 17 (S16).

Figure 7:
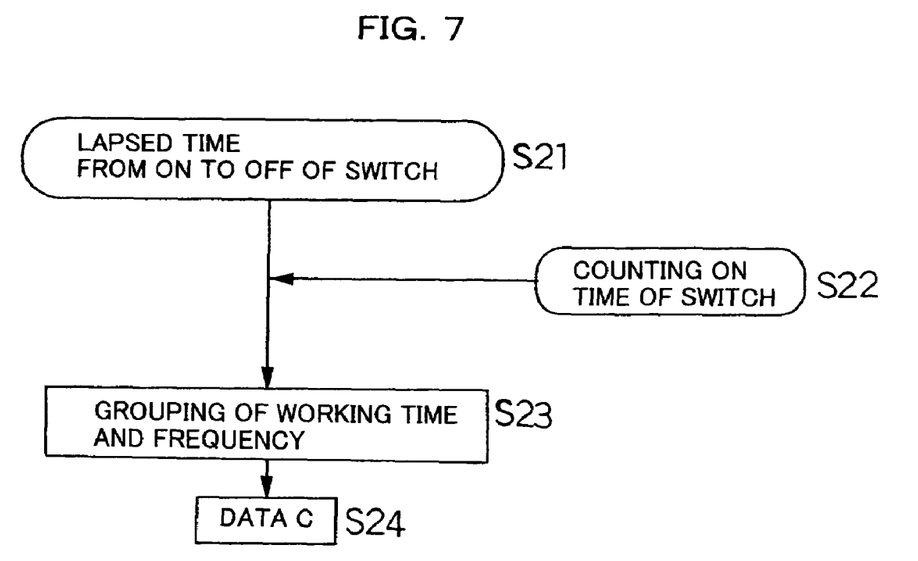
FIG. 7 is a flowchart showing a process for obtaining data concerning working time and a number of times (frequency) in the power tool.

Still furthermore, as shown in FIG. 7, the control unit 15 reads out all data concerning lapsed time (working time) during the period from turn-on to turn-off of the switch 14 and the number of times of turn-on of the switch 14 (S21, S22), performs the grouping of the lapsed time in units of predetermined time, and obtains a working time and a number of times (frequency) from the number of data contained in each group (S23). Then, the data C concerning the grouping is recorded in the memory 17 (S24).

Figure 8:
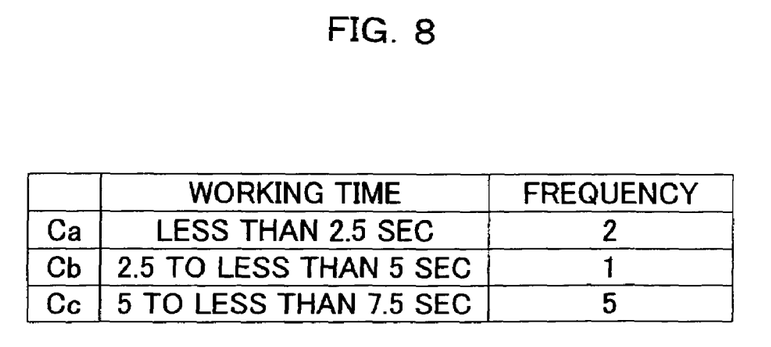
FIG. 8 is a table showing a relation between working time and frequency in using the power tool.

FIG. 8 shows a table 1 showing a relation between the working time and the number of times. In this embodiment, an electric driver is shown as an example of the power tool 1. However, in the table 1, the working time corresponds to a time necessary to tighten one screw, and the number of times corresponds to the number of screws.

Besides, each of the data A, B and C is additionally written into the memory 17 at each time when the power tool 1 is used (or when a judgment is made that continuous work is completed).

Meanwhile, the program for assisting selection of power tool is run in the assist apparatus 2 formed of a personal computer set up in a shop, service center or the like. As shown in FIG. 1, the data A, B and C are read out from the memory 17 when the power tool 1 is connected thereto. The assist apparatus 2 analyzes the data A, B and C read out according to the program, and recommends a product most suitable to the user's needs or advises usage most suitable to the user's needs or usage capable of bringing out capabilities of the power tool 1, based on the analysis results.

As for a method to read out data to the assist apparatus 2 from the memory 17 of the power tool 1, as shown in FIG. 1, a cable such as a USB cable may be connected between the power tool 1 and the assist apparatus 2. Alternatively, it is possible that a detachable memory card as the memory 17 is used and the memory 17 removed from the power tool 1 is connected to a reader-writer for memory card of the assist apparatus 2. Furthermore, it is possible to connect between the power tool 1 and the assist unit 2 by a wireless communication (including IR communication).

Figure 9:
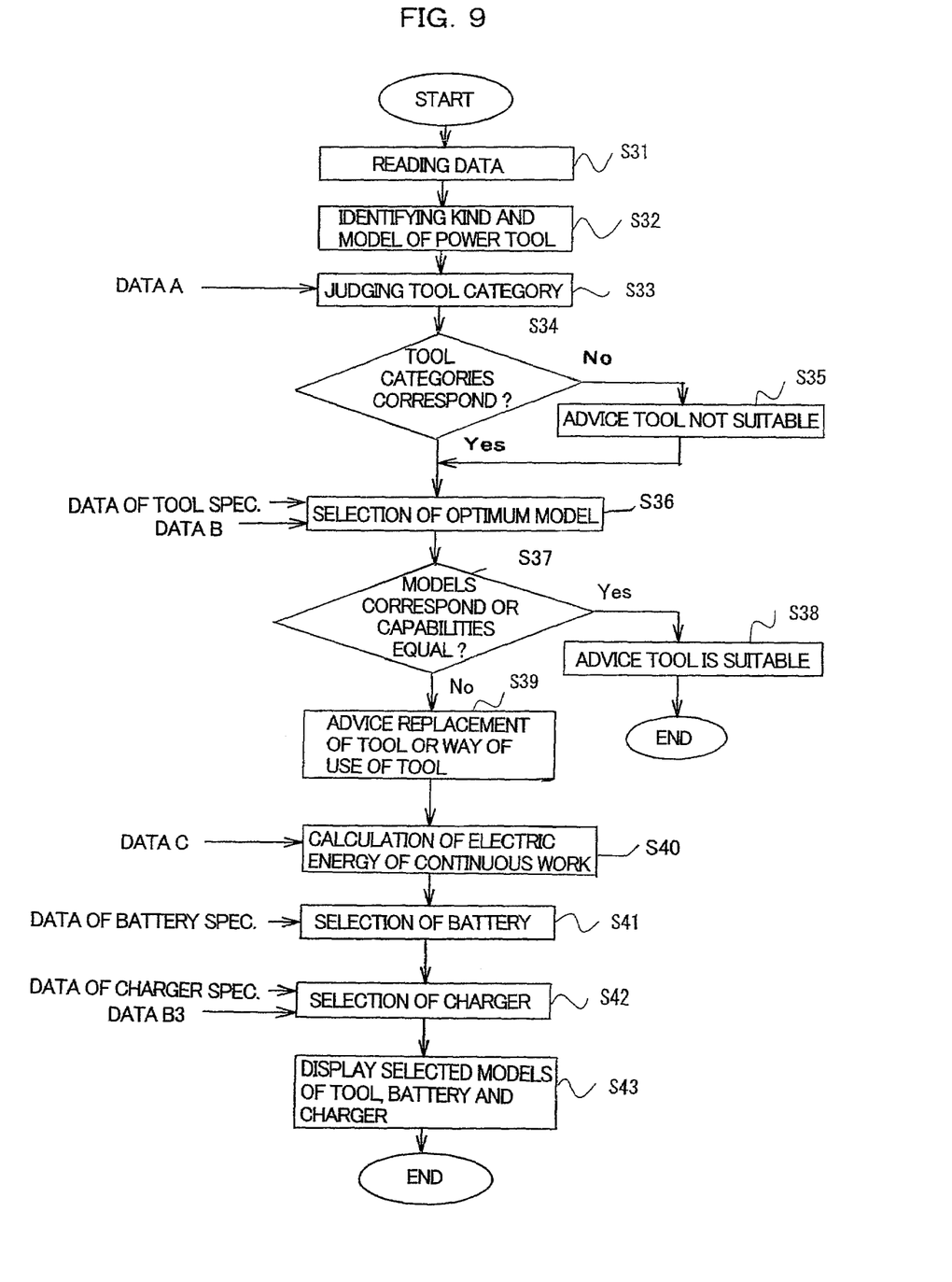
FIG. 9 is a flowchart showing a configuration of a program for assisting selection of power tool in accordance with the embodiment.

Subsequently, a program for assisting selection of power tool run in the assist apparatus 2 will described with reference to a flowchart shown in FIG. 9. The program run in the assist apparatus 2 comprises a database storing specifications of each model of the power tools, specifications of batteries and battery chargers therein.

When data is read out from the memory 17 (S31), the data includes data concerning the model of the power tool 1. Thus, the assist apparatus 2 identifies the model and capabilities of the power tool used by the user (S32). Subsequently, according to the assist program, using the data A (Aa to Ad) indicating the combinations between the maximum current value and the average current value among the data A, B and C read out from the memory 17, the category of the power tool suitable for performing the work, for example, whether the work should be performed by use of an electric drill driver or electric impact driver, is judged (S33).

When the category to which the power tool suitable for the work belongs is judged, the category is compared with the category to which the power tool 1 that actually performs the work belongs (S34). When the category to which the power tool 1 belongs does not correspond to the category to which the power tool suitable for the work belongs, the fact is displayed on the display 3 to the user in this stage, and it is informed that the power tool currently used by the user is not suitable for the work (S35).

Subsequently, despite whether the category to which the power tool 1 belongs corresponds to the category to which the power tool suitable for the work belongs or not, on the basis of the above-mentioned data A and the data B concerning continuity of the work, an optimum model suitable to the user's needs is selected among a plurality of models each having different capabilities in the category (S36). Then, the model and capabilities of the power tool 1 used by the user are compared with those of the selected power tool (S37). Hereupon, when the power tool 1 used by the user corresponds to the model selected according to the assist program, or the capabilities of the power tool 1 used by the user are substantially equal to those of the selected model, it is displayed on the display 3 that the power tool 1 currently used by the user is suitable for the work (S38).

On the other hand, when the power tool 1 used by the user does not correspond to the model selected according to the assist program, or the capabilities of the power tool 1 used by the user are not substantially equal to those of the selected model, it is recommended to replace it with a power tool suitable for the work by purchase, or a way of using the power tool 1 is suggested so as to suit the power tool 1 to the work (S39). For example, when it is judged that the torque of the motor 11 of the power tool 1 used by the user is insufficient for the work of screw tightening, it is recommended to replace with a power tool with larger torque by purchase. On the contrary, when it is judged that the torque of the motor 11 of the power tool 1 used by the user is too high for the work of screw tightening, it is advised to lower the setting value of torque to the user. That is, the work description of the user is estimated, and furthermore, a power tool with capabilities (load capability, or resistance to continuous operating time) suitable for the work description is selected, and usage of the power tool suitable for the work is suggested, with using the above-mentioned data.

Similarly, electric energy used during continuous work is calculated from the data A and data B with reference to the data C (S40), and a secondary battery pack that can provide this used electric energy and is suited to the above-mentioned selected model is selected (S41). Furthermore, it is judged whether quick charging capability is required or not on the basis of a minimum value among the data B3 concerning continuity of work and the above-mentioned electric energy used during continuous work. When quick charging is required, charging performance, for example, how many minutes charging should be completed, is judged, and a battery charger suitable to the above-mentioned selected secondary battery pack is selected (S42). Then, the models of the selected power tool, secondary battery pack and battery charger are displayed on the display 3 (S43).

In this manner, according to the advice displayed on the display 3, the user can learn usage of the power tool 1 suitable for the work or consider replacement of the power tool 1 by purchase with reference to the model of the power tool suitable for the work.

Figure 10:
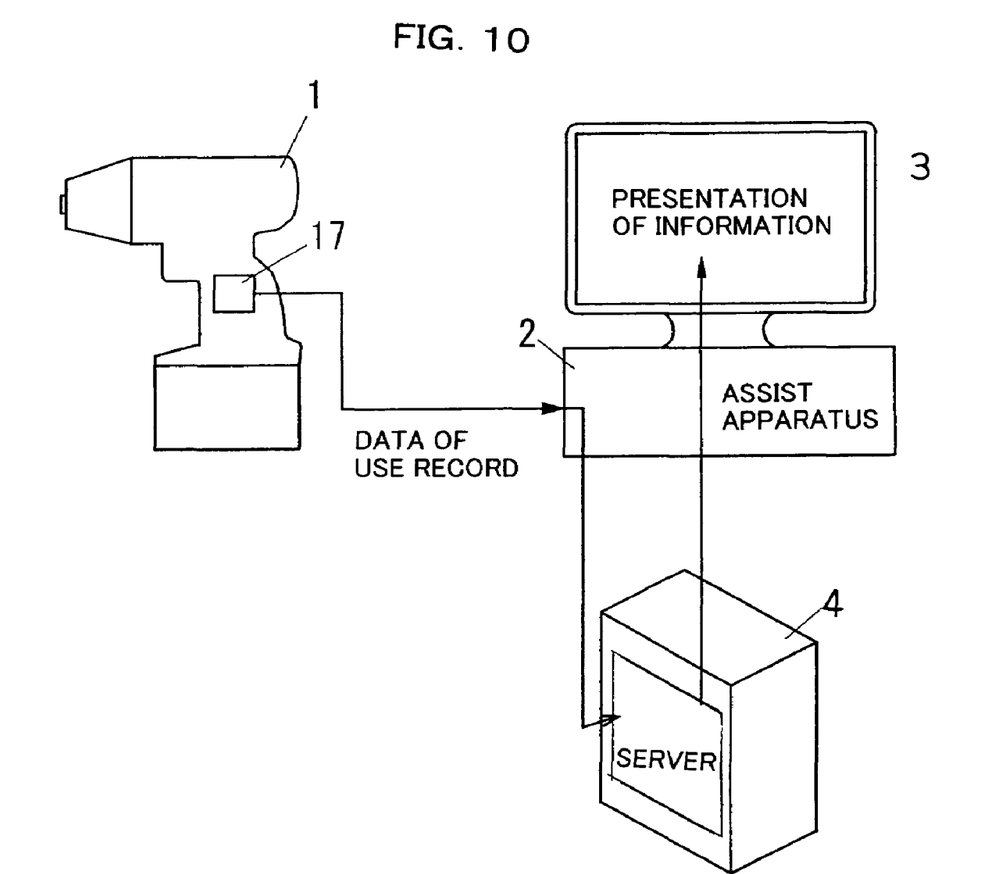
FIG. 10 is a view showing another configuration of a system for assisting selection of power tool in accordance with an embodiment of the present invention.

FIG. 10 shows a modified example of the system for assisting selection of power tool in accordance with this embodiment. As shown in FIG. 10, the program for assisting selection of power tool is run on a server 4 connected to the assist apparatus 2 via the internet or the like, and the data in the memory 17 of the power tool 1 is transferred from the assist apparatus 2 set up in a shop or a service center to the server 4. The above-mentioned assist program is run on the server 4, and each advice in the S35, S38 and S39 of the flowchart and the models of the power tool, secondary battery pack and battery charger selected in the S43 of the flowchart are displayed on the display 3 connected to the assist apparatus 2.

It is possible to provide an area in the memory 17 for storing information on the user, purchase date and password of the power tool 1 other than the above-mentioned data A, B and C may. The information of the user and the like is input on the side of the assist apparatus 2, for example, when the power tool 1 is purchased newly. Then, by reading out the data, for example, when the power tool 1 is connected to the assist apparatus 2 again, the shop or the service center of the power tool in which the assist unit 2 is located can collect the information relating to the user and the power tool used by the user to make use of the information for user management and merchandise control. For example, they can send an advertising announcement of products with a presentation of a recommended model, for example, when a new product is launched or a predetermined period has passed since purchase date.

Furthermore, when temperature, battery voltage, and the number of times of overdischarge and overload of the secondary battery pack 16 during work are detected and the data are written into the memory 17, it is possible to select the battery more properly by using the data, and to judge the lifetime (the number of times of charge and discharge) of the secondary battery pack 16 by comparing dischargable capacity with battery voltage or so, and to suggest replacement with the new secondary battery pack 16 or replacement time.

Still furthermore, it is possible to input the preferences of the user on the power tool (color of appearance, key-type or keyless-type chuck, preferences on usage of the user) into the memory 17 by using the assist unit 2 as services provided by shops (dealers) and service centers (makers). In such a case, when another power tool is presented to the user, a power tool can be selected in reference to the above-mentioned preferences. When there is no power tool most suitable to the work description of the user among the lineup of original products, it is possible to receive an order of a semi custom-made power tool with the specification suitable for the work description of the user.

When a new model of the power tool or battery is launched, it may be configured so that the specification data of the new model is downloaded into the assist apparatus 2 from power tool makers and so on via the internet or the like, and database is updated automatically.

Furthermore, although it is configured to store the data A, B and C subjected to processing such as grouping in advance in the memory 17, it may be also configured so as to store raw data such as sampling data of current values in the memory 17 and perform processing such as grouping on the side of the assist apparatus 2 according to the program.

Still furthermore, although description is given using the electric driver as an example, the present invention is not limited to this and needless to say, can apply to electric drills, electric saws and other power tools.

Still furthermore, although the cordless-type power tool 1 that builds the rechargeable secondary battery pack 16 therein is used in the above description, the present invention is not limited to this and can apply to cord-type power tools that receive electric power from commercial power source.

This application is based on Japanese Patent Application No. 2003-78742 filed on Mar. 20, 2003 and the contents should be incorporated into the present invention by reference of the specification and figures of the above-mentioned patent publication.

While the present invention has been fully described in the embodiments with reference to the appended figures, it will be obvious to those skilled in the art that various changes and modifications may be made. It is therefore to be understood that such changes and modifications fall within the scope of the present invention without departing from the scope of the present invention.

INDUSTRIAL APPLICABILITY

As described above, according to the present invention, since record data concerning use of the power tool is stored in the memory and it is possible to judger whether the power tool used by the user is suitable for the work or not performed by using the power tool, the user can obtain information on whether the user uses the power tool suitable for the work description or not. When the power tool used by the user is not suitable for the work description, the models of the power tool, battery and battery charger suitable for the work description can be selected to present the models to the user. Thus, the user can select the model of the power tool at replacement by purchase with reference to the selected models. It is also possible to advise usage suitable for the power tool used by the user.

Furthermore, since the makers and dealers of the power tool can obtain many data concerning the used description of the power tool from the power tool used by the user, it is possible to utilize the data for development of new model of the power tool or for sales of the products.

Still furthermore, since it is possible to judge the lifetime of the secondary battery pack on the basis of use record data concerning the secondary battery for power source, which is written into the memory, and present result of judgment, the user can accurately know lifetime and replacement time of the battery.

The invention claimed is:

1. A system for assisting in selection of a power tool, which is connected to a memory provided in a power tool with a rechargeable battery for storing data concerning a model or specification of the power tool and data concerning a use record therein, reads out the data from the memory, judges whether or not the power tool is suitable for work description for which the power tool is used, by using the data read out, and selects and presents the power tool suitable for the work description when the power tool is not suitable for the work description, the system comprising:

a memory unit configured for storing data concerning a plurality of selectable models and specifications of power tools, a plurality of models and specifications of batteries configured for attachment to the power tool and a plurality of models and specifications of battery chargers for charging the battery;

a power tool suitability judger configured for judging whether or not the model or specification of the power tool is suitable for the work description using the data concerning the use record read out of the memory;

a power tool selector configured for selecting a model of the power tool with a specification suitable for the work description and a model of the battery and a battery charger suitable for the work description among the models of the power tools and the models of the battery and the battery charger stored in the memory unit when it is judged that the model or specification of the power tool is not suitable for the work description; and a display configured for displaying results of judgment by the power tool suitability judger and the model of the power tool, the model of the battery pack and the model of the battery charger selected by the power tool selector.

2. The system for assisting in selection of a power tool in accordance with claim 1, wherein the data concerning the use record includes working time during a period from turn-on to turn-off of a switch of the power tool, resting time during a period from a turn-off to a next turn-on of the switch, a number of times that the switch is turned on, a maximum current value and an average current value of currents flowing to a motor during the working time.

3. The system for assisting in selection of a power tool in accordance with claim 1 further comprising:

a battery lifetime judger for judging lifetime of the battery when the memory of the power tool further stores record data concerning charge and discharge of the battery therein; and wherein the display displays remaining lifetime and replacement time of the battery.

4. A recording medium that records a program for assisting in selection of a power tool which selects and presents a model of a power tool suitable for work description of the user, a model of a battery and a battery charger suitable for the work description by being read and run in a computer, the program comprising:

reading out data concerning a model or specification of the power tool and data concerning a use record from a memory provided in the power tool;

judging whether or not the model or specification of the power tool is suitable for the work description using the data concerning the use record read out from the memory;

selecting a model of the power tool with a specification suitable for the work description and a model of the battery and a battery charger suitable for the work description among the models of the power tools and models of the battery and the battery charger when it is judged that the model or specification of the power tool is not suitable for the work description; and displaying a result of judgment and the selected model of the power tool, model of the battery and model of the battery charger.

5. The recording medium that records a program for assisting in selection of a power tool therein in accordance with claim 4, wherein the data concerning the use record includes working time during a period from turn-on to turn-off of a switch, resting time during a period from turn-off to a next turn-on of the switch, a number of times that the switch is turned on, a maximum current value and an average current value of currents flowing to a motor during the working time.

6. The recording medium that records a program for assisting in selection of a power tool therein in accordance with claim 4, wherein the program for assisting in selection of the power tool further comprises reading out a record data concerning charge and discharge of the battery from the memory, judging a lifetime of the battery and displaying a remaining lifetime or replacement time of the battery, when the memory of the power tool further stores record data concerning charge/discharge of the battery therein.

7. A computer readable recording medium that stores a program for assisting in selection of a power tool which selects and presents a model of a power tool suitable for work of a user, a model of a battery and a battery charger suitable for the work by being read and run in a computer, the program comprising:

reading out data concerning a model of a power tool actually used to perform work and data concerning a use record of the power tool actually used to perform the work from a memory provided in the power tool;

identifying the model and capabilities of the power tool actually used;

judging a category of a power tool suitable for performing the work using the data concerning the use record read out from the memory;

comparing the category of the power tool suitable for performing the work with the category to which the power tool actually used belongs;

indicating, on a display, that the power tool actually used is not suitable for the work, when the category to which the power tool actually used belongs does not correspond to the category of the power tool suitable for the work;

selecting an optimum model of the power tool suitable for the work;

comparing the model and capabilities of the power tool actually used with those of the selected optimum model of the power tool suitable for the work;

indicating, on the display, that the power tool actually used is suitable for performing the work, when the model and capabilities of the power tool actually used correspond to those of the selected optimum model of the power tool suitable for the work;

calculating electric energy used while performing the work continuously using the data concerning the use records;

selecting a model of a battery that can provide the electric energy necessary to perform the work continuously;

judging a charging performance of the battery charger and selecting a battery charger suitable to the selected battery, when quick charge is required; and indicating, on the display, the optimum models of the selected power tool, battery and battery charger.

8. The computer readable recording medium that stores a program for assisting in selection of a power tool in accordance with claim 7, further comprising:

displaying a recommendation to replace the power tool actually used with a power tool suitable for the work or suggesting a way of using the power tool actually used so as to be suitable for the work, when the model and capabilities of the power tool actually used do not correspond to the model and capabilities of the selected optimum model of the power tool suitable for the work.

* * * * *